G. H. Reynolds,
Steam Cut-Off.
No. 2,381. Reissued Oct. 16, 1866.
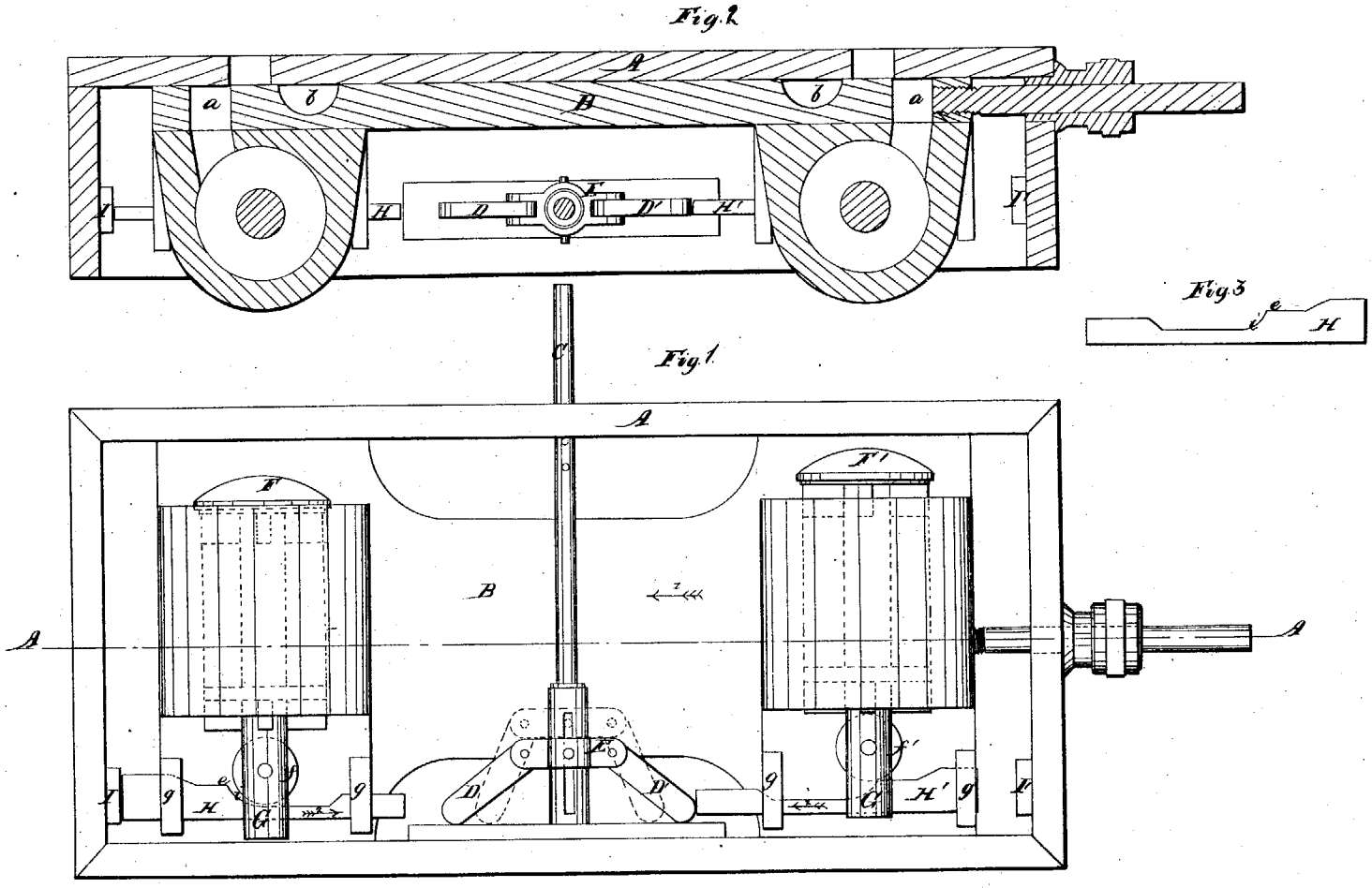
AM. PHOTO-LITHO. CO. N.Y. (OSBORNE'S PROCESS.)

UNITED STATES PATENT OFFICE.

G. H. REYNOLDS AND M. A. HINCKLEY, (ADMINISTRATRIX OF D. B. HINCKLEY,) OF MYSTIC BRIDGE, CONNECTICUT, ASSIGNEES OF G. H. REYNOLDS.

IMPROVED METHOD OF OPERATING CUT-OFF VALES.

Specification forming part of Letters Patent No. 16,570, dated February 3, 1857; Reissue No. 2,381, dated October 16, 1866.

*To all whom it may concern:*

Be it known that I, GEORGE H. REYNOLDS, formerly of Medford, in the county of Middlesex and State of Massachusetts, and now residing at Mystic Bridge, Connecticut, have invented a new and Improved Method of Operating Cut-Off Valves, of which the following is a full, clear, and exact description, reference being had to the accompanying drawings, making part of this specification, in which—

Figure 1 is an elevation of a steam-chest and slide-valve with my improvements attached. Fig. 2 is a horizontal section upon the line A A of Fig. 1. Fig. 3 is a detached view of one of the slides, to be referred to hereinafter.

To enable others skilled in the art to understand my invention, I will proceed to describe the method in which I have carried it out.

In the said drawings, A is the steam-chest; B, an ordinary slide-valve, with its steam and exhaust ports *a b;* C, the rod which is operated up and down by the governor, and which gives motion to the arms D D′, which are hinged to a strap or ring, E, secured to the governor-rod, by which connections, as the motion of the engine is diminished and the governor-balls are lowered, the arms are drawn up toward the center of the chest, approaching the position seen in red in Fig. 1.

F F′ are balance puppet-valves, which are carried on the slide-valve B, and through which the steam passes to the induction-ports *a*. The stems G of these valves are slotted from beneath, and carry the rollers *f f′*, which rest upon the sliding wedges H H′, the object and operation of which will now be explained.

In Fig. 3 is represented one of these sliding wedges or slides detached. It is held to the surface of the slide-valve by the straps or guides *g*, within which the slides are allowed to move longitudinally independent of the motion of the slide-valve. As the slide-valve B and its connections move in the direction of the arrow, the puppet-valve F is opened by the striking of the slide H against the stop I, the roller passing up the incline of the slide, and the position of the slides being such with regard to the rollers that the latter shall rest upon the point *e* at the top of the incline when the valve is open, and whenever the slides are slightly moved in a direction contrary to the arrows 2 the rollers fall upon the inclines *i*, and by their weight force back the slides and close the valves, whereby an instantaneous cut-off is produced at the point described, however slow may be the motion of the slide-valve.

The operation is as follows: In the drawings, the slide-valve is represented as moving in the direction of the arrows 1. As its motion continues in this direction the slide H strikes against the stationary stop I, and the slide is forced back beneath the valve F, its roll *f* passing up the incline *i* and resting upon the point *e*. The valve F is thus open in advance, ready to admit steam, when, on the return of the slide-valve, the port *a* is opened. At the other end of the chest the valve F′ remains open until its slide H′ strikes against the movable stop D′, when the valve F′ is instantly dropped and the steam is cut off. This will take place sooner or later, according to the velocity with which the engine is moving and the consequent position of the stops D D′. As the valve B continues its return motion the slide H is tripped by the stop D in a similar manner, while the opposite valve, F, is raised by the stop I, ready for another advance of the slide-valve.

In cut-offs of this description, as heretofore arranged, the closing of the cut-off valve has been dependent upon the velocity of motion of the slide-valve, in consequence of which the cut-off was not instantaneous at the point required.

By means of the above-described arrangement of parts each valve is suddenly closed at the point indicated by the governor, while their descent is so eased by the incline *i* as to prevent the noise, concussion, and wear consequent upon a direct fall of the valve upon its seat.

Upon locomotives the rod C, in lieu of being connected with the governor, is placed under the control of the engineer, by which means he is enabled to cut off steam at any point.

Some of the advantages due to certain features of my invention may be separately enumerated as follows: First, by reason of the fact that my cut-off mechanism does not operate the main slide or steam-valve itself, but only the detached valves F F′, its use (in common with all this class of cut-offs) greatly lessens the magnitude of the disaster in case the cut-off mechanism becomes broken or deranged in its action; and by reason of the two further facts that my cut-off valve F closes an aperture not in a fixed plate, but in the steam-valve B, and that its rate of closing is not controlled by the motion of the engine, but is independent thereof, and may be equally rapid whether the strokes of the engine are slow or fast, I am able under all conditions to both cut off the steam without loss by a useless expansion in the valve-chest, and to effect this with a rapidity of motion which may always be the highest which the weight and strength of the parts will allow. Second, by reason of the fact that my cut-off valve F, arranged and operated as above described, is supported on inclined transversely-moving supports H H, as represented, I am able to lower the valve automatically with a rapid but gentle motion, and with very simple mechanism.

Having now fully described my invention, what I claim as new therein, and desire to secure by Letters Patent, is as follows:

1. Automatically shutting a cut-off valve carried on the steam-valve, so that so soon as the valve commences to close it will continue its closing motion independent of the motion of the engine, substantially as and for the purposes herein specified.

2. The inclined dogs H H, arranged to operate in connection with a cut-off valve, F, carried on the steam-valve B, substantially in the manner and for the purpose herein set forth.

GEO. H. REYNOLDS.

Witnesses:
D. W. STETSON,
D. L. FREEBORN.